April 5, 1927. 1,623,192
G. D. LIVINGSTON
MEASURING DEVICE
Filed Nov. 2, 1925
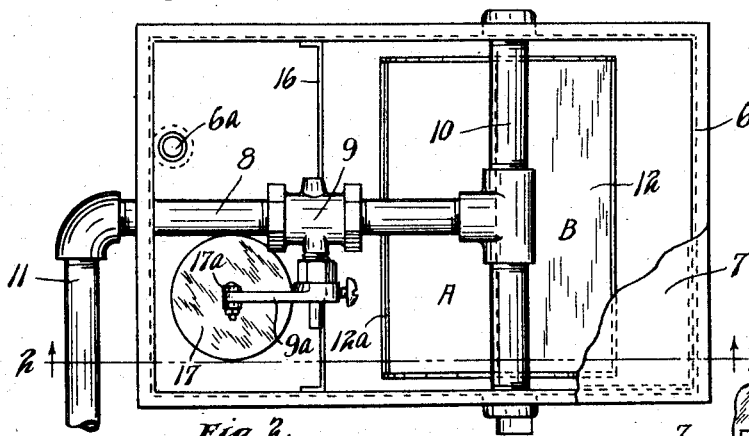
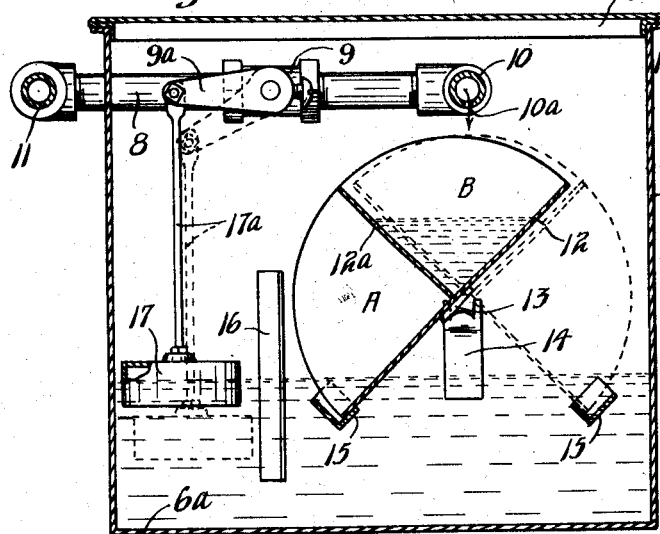
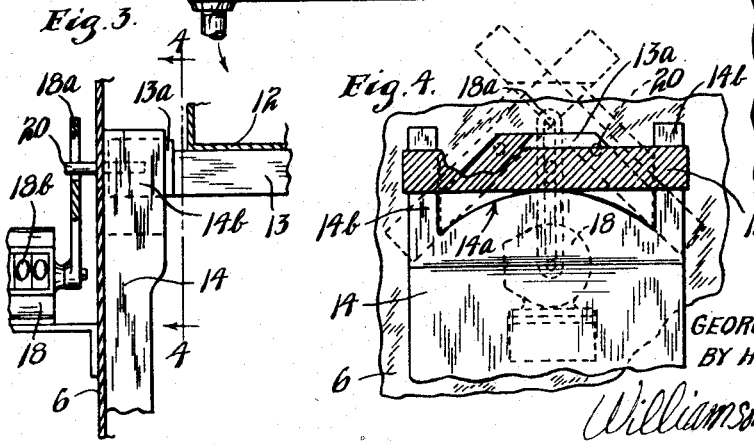
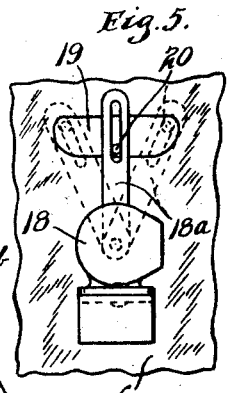
INVENTOR.
GEORGE D. LIVINGSTON.
BY HIS ATTORNEYS.

Patented Apr. 5, 1927.

1,623,192

UNITED STATES PATENT OFFICE.

GEORGE D. LIVINGSTON, OF ANOKA, MINNESOTA.

MEASURING DEVICE.

Application filed November 2, 1925. Serial No. 66,255.

This invention relates to measuring devices especially adapted for liquids but capable of also measuring solid material when in divided or fragmentary condition.

The embodiment of the invention illustrated is especially designed for weighing and recording the water fed to boilers, but the invention is, of course, capable of wide general usage for measuring and weighing devices of all kinds.

The main object of this invention is to provide an extremely simple and inexpensive but highly efficient measuring device provided with positive means operated by gravity for automatically weighing and registering the number of units of material dispensed.

It is a further object to provide such a device having a movable frame or hopper provided with two compartments so mounted that said compartments will be successively filled and dumped by the accumulation of a certain amount of material therein, thereby discharging predetermined amounts of material at intervals, the movement of said hopper being operatively connected to mechanism to register the number of units dispensed.

It is an additional object to provide a measuring device employing a rockable frame provided with two compartments to receive and discharge material and supporting means for said rockable frame capable of holding said frame in tilted position to receive dispensed material with the vertical center line of one of the compartments at the side of the point of support of the frame, whereby, when a certain amount of material has accumulated in the compartment disposed to receive, the frame will be automatically rocked to the opposite tilted position, the material discharged in so doing and the opposite compartment brought into receiving position.

These and other objects of the invention will be apparent from the following description made in connection with the accompanying drawings, wherein like characters refer to similar parts throughout the several views, and in which, Fig. 1 is a plan view of an embodiment of the invention with a substantial portion of the cover of the casing broken away to show the mechanism within;

Fig. 2 is a vertical section taken on the line 2—2 of Fig. 1;

Fig. 3 is a fragmentary vertical section on a larger scale showing the construction of the rocker bar and supporting means therefor;

Fig. 4 is a vertical cross section taken on the line 4—4 of Fig. 3; and

Fig. 5 is a fragmentary side elevation showing the operative connection between the movable frame and counting device employed.

Fig. 5$^a$ is a vertical section thru a trunnion of the rocker bar.

In the embodiment of the invention herein illustrated, a substantially rectangular liquid reservoir or tank 6 is provided having its top closed by means of the flanged lid 7 and provided with an outlet passage 6$^a$ through the bottom thereof. A delivery conduit 8 is shown mounted within the top portion of reservoir 6 provided with the valve 9 at its intermediate portion and communicating at its outer end with a spraying nozzle 10 shown in the form of a transversely disposed pipe having through the bottom side thereof a plurality of outlet orifices 10$^a$. The ends of nozzle 10 are, of course, closed, being supported by the sides of reservoir 6. The outer end of delivery member 8 extends through one side of reservoir 6 being threaded for connection to a source of liquid supply such as conduit 11.

A receiving and discharging member or scale pan 12, comprising a pair of separate trough-like compartments A and B is rockably mounted below the delivery nozzle 10. A rocker bar 13 is secured centrally to the underside of the frame 12 in alignment with the central partition 12$^a$ forming compartments A and B. Rocker bar 13 has a flat bottom surface, shaped at its end to form trunnions 13$^a$ preferably having beveled sides. The trunnions 13$^a$ engage and are supported by the convex or arcuate supporting surfaces 14$^a$ of upright oppositely aligned supports 14 preferably secured to the sides of reservoir 6. It will also be noticed that supports 14 provide the vertical abutting shoulders 14$^b$ at each side of convex supporting surfaces 14$^a$, adapted to abut against the beveled edges on trunnions 13$^a$. Obviously the frame member 12 is mounted to rock on supports 14, limited in its movement by the engagement of shoulders 14$^b$ with beveled edges of trunnions 13$^a$, and it is also limited in movement by means of transversely and obliquely disposed members 15 carried by the opposite sides of reservoir 6 in position to support the respective ends of frame member 12 when in their respective extreme positions. A vertical transverse partition 16 is disposed intermediate of reservoir 6 and adjacent one end of frame 12. A suitable float 17 is disposed in reservoir 6 at the side of partition 16 opposite to said rockable frame, operatively connected to valve 9 through the upstanding member 17ª pivoted to valve controlling lever 9ª.

A counting device 18 of a standard type actuated by the reciprocation of an arm 18ª is carried on one of the outer sides of reservoir 6 substantially aligned with supports 14. A substantially elliptically shaped slot 19 is formed in the side of reservoir 6 above counting device 18, through which a relatively small pin 20 works, carried at one end of rocker bar 13. Pin 20 is slidably connected to the reciprocating arm 18ª of said counting device, whereby the reciprocations or rocking of frame 12 may be registered on the reading face 18ᵇ of said counting device.

The operation of the device may be briefly summarized as follows: Assuming frame 12 disposed in extreme rocked position with compartment B in position to receive from nozzle 10, it will be noticed that the rocker bar 13 will engage supporting surface 14ª only on its left edge, the adjacent beveled side contacting shoulder 14ᵇ. It will also be noticed that the center line of compartment B will be disposed at the side of point of support of rocker bar 13. Due to the weight of partition 12ª and disposition of the same when empty, frame or scale pan 12 will be held in this receiving position. When compartment B has been filled to a certain height with liquid from delivery member 8, the center of gravity of frame 12 will be changed, more weight being then disposed at the right side of the point of support than at the left and frame 12 will rock on its support 14, compartment B discharging its load and the momentum and force of the discharging liquid being sufficient to rock frame 12 to its opposite extreme position with compartment A in position to receive. Here again the rocker bar rests on its right knife edge against the right shoulder 14ᵇ of support 14, compartment A having its vertical center line disposed to the left side of the line of support of the rocker bar 13.

The above described operation will be successively and continuously repeated and the reciprocating or rocking movement of bar 13 will, of course, be transmitted to counting device 18 thru pin 20 and its slotted engagement with actuating arm 18ª. The number of complete rocks or reciprocations of frame 12 will, therefore, be registered on the standard counting device 18, ascertainable thru the reading glass 18ᵇ. The flow of liquid thru delivery conduit 8 is controlled by means of the float operated valve 9, so that the level of the liquid in reservoir 6 is maintained substantially standard.

Partition 16 prevents the splash of water discharging from compartment A from displacing float 17 while transverse bars 15 limit the extreme rocking positions of frame 13.

The shape of supporting surface 14ª and of trunnions 13ª are, of course, of utmost importance in producing the above described results, since the compartment in position to receive must be held in tilted position with its vertical center line disposed at the side of the point of support of frame 12.

From the above description it will be seen that the applicant has invented a simple but highly efficient automatic measuring device, capable of wide general usage and relying on gravity for its positive actuating mechanism.

Extensive actual usage has shown the device to be successful for all the purposes enumerated.

It will, of course, be understood that various changes may be made in the form, details, proportions and arrangement of parts without departing from the scope of the invention.

What is claimed is:

1. A measuring device comprising means for delivering material to be measured, an oscillating measuring receptacle disposed below said means, supporting means for said receptacle having a convex bearing surface, and means for limiting the oscillation of said receptacle in either direction.

2. A measuring device having in combination means for delivering material to be measured, an oscillating measuring receptacle disposed below said means, a rocker bar having a flat bearing surface, supporting means for said rocker bar having a convex bearing surface, means for limiting the movement of said receptacle in either direction, and means for registering the number of movements of said receptacle.

3. A measuring device having in combination means for delivering material to be measured, a scale pan mounted below said means, a rocker bar having a pair of knife edges on the sides thereof, and supporting means for said rocker bar including stop members at each side thereof adapted to engage said respective knife edges.

4. A measuring device having in combination a means for delivering material to be measured, a rocker bar having a flat bearing surface terminating at its sides in a pair of knife edges, supporting means for said rocker bar having a bearing surface of arcuate cross section and having shoulders at the sides thereof adapted to engage the outer sides of said knife edges to limit the rocking movement of said bar in either direction, and a centrally divided measuring receptacle mounted on said rocker bar and disposed below said delivery means.

5. A measuring device having in combination a tank provided with an outlet adjacent the bottom thereof, means for delivering material to be measured adjacent the top of said tank, a scale pan mounted for oscillation within said tank below said delivery means, a float within said tank adapted to control the flow of material delivered, and a partition between said float and said scale pan spaced at some distance above the bottom of said tank and operative to prevent material from splashing on said float.

6. A measuring device having in combination a delivery member adapted to be connected to a supply source of material, a member disposed to receive from said delivery member comprising a pair of compartments, a rocker bar carried by said member substantially centrally thereof and means for supporting said rocker bar to hold said member in tilted position with one of said compartments disposed to receive until said compartment has been filled to a certain height and to then cause said member to rock to discharge said filled compartment and bring said second compartment into receiving position, said supporting means comprising a convex surface and means cooperating therewith to limit the rocking of said member in both directions.

7. A measuring device having in combination a delivery member adapted to be connected to a supply source of material, a frame disposed below said delivery member and comprising a pair of compartments, a rocker bar centrally secured to the underside of said frame having a flat bottom surface, supporting members for said rocker bar having convex supporting surfaces adapted to rockably mount said frame and means for limiting the movement of said frame in both directions to dispose one of said compartments in receiving position to said delivery member with its vertical center line at one side of the point of support of said rocker bar.

In testimony whereof I affix my signature.

GEORGE D. LIVINGSTON.